March 3, 1964   R. C. YOUNG ETAL   3,123,169
FOUR WHEEL DRIVE VEHICLE WITH AUTOMATIC WHEEL
DRIVE DISCONNECT MEANS
Filed Oct. 24, 1960   8 Sheets-Sheet 1

INVENTORS
RALPH C. YOUNG
RICHARD T. BINGMAN
BY
*Horace B. Van Valkenburgh*
ATTORNEY INVENTORS
RALPH C. YOUNG
RICHARD T. BINGMAN
BY
Horace B. Van Valkenburgh
ATTORNEY

INVENTORS
RALPH C. YOUNG
RICHARD T. BINGMAN

INVENTORS
RALPH C. YOUNG
RICHARD T. BINGMAN
BY
Horace B. Van Valkenburgh
ATTORNEY

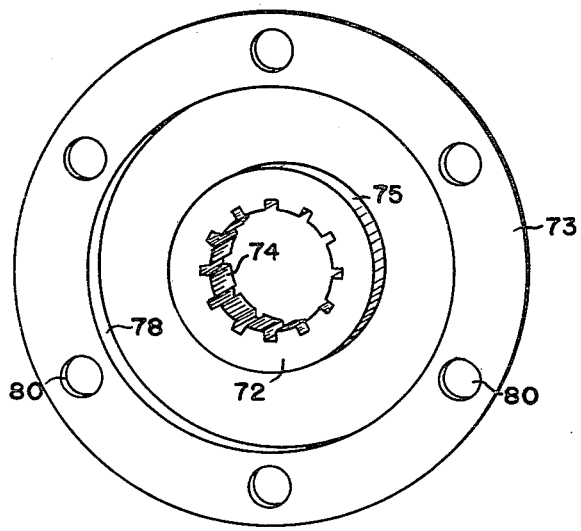
FIG. 9
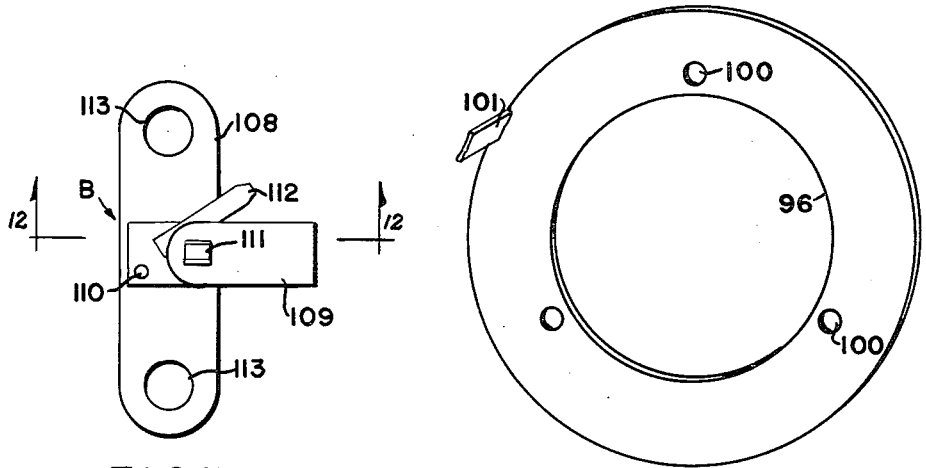
FIG. 11
FIG. 10
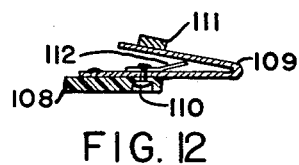
FIG. 12
*INVENTORS*
RALPH C. YOUNG
RICHARD T. BINGMAN
ATTORNEY

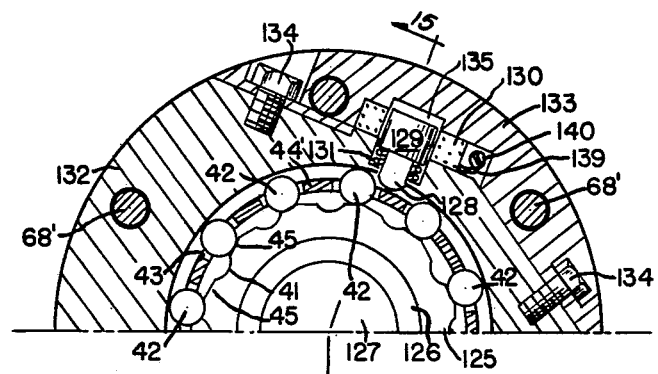

INVENTORS.
RALPH C. YOUNG
RICHARD T. BINGMAN
BY Horace B Van Valkenburgh
ATTORNEY March 3, 1964 R. C. YOUNG ETAL 3,123,169
FOUR WHEEL DRIVE VEHICLE WITH AUTOMATIC WHEEL
DRIVE DISCONNECT MEANS
Filed Oct. 24, 1960 8 Sheets—Sheet 8
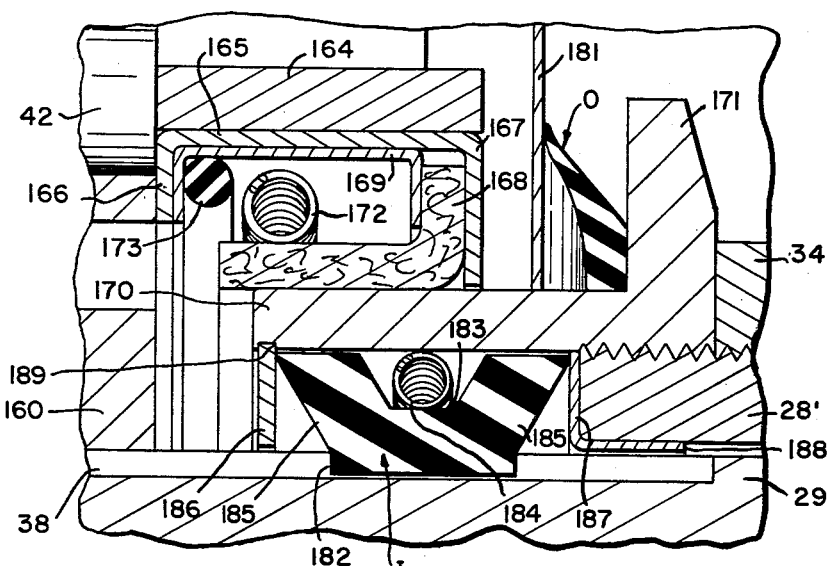
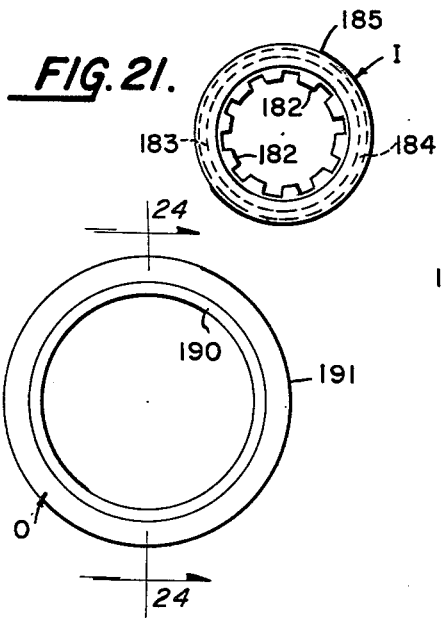
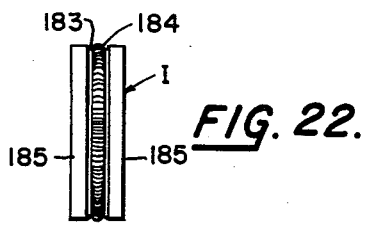
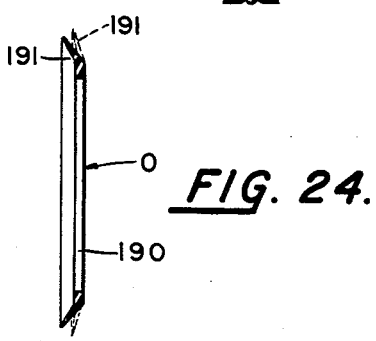
INVENTORS.
RALPH C. YOUNG
BY RICHARD T. BINGMAN
Horace B. Van Valkenburgh
ATTORNEY

United States Patent Office 3,123,169
Patented Mar. 3, 1964

3,123,169
FOUR WHEEL DRIVE VEHICLE WITH AUTOMATIC WHEEL DRIVE DISCONNECT MEANS
Ralph C. Young and Richard T. Bingman, Colorado Springs, Colo., assignors to White Manufacturing Company, Colorado Springs, Colo., a corporation of Illinois
Filed Oct. 24, 1960, Ser. No. 64,567
23 Claims. (Cl. 180—44)

This invention relates to automatically operating hubs for vehicles and more particularly to hubs for wheels which are optionally driven, such as the front wheels of four-wheel drive vehicles. This application is a continuation-in-part of our copending application Serial No. 3,650, filed January 20, 1960, entitled "Automatic Hubs For Vehicles."

When the front wheels of a four-wheel drive vehicle are optionally driven from the engine, the drive to the front wheels is taken from the transmission. However, the driving parts between the transmission and the front wheels, when the drive to the front wheels is disconnected at the transmission, produces an undue resistance to the rotation of the front wheels, which is undesirable. In addition, the operating costs are increased, since the parts rotated by the front wheels are numerous. By providing a hub at each front wheel, which will connect the front wheel to the drive axle only when desired, the rotation by the front wheels of the driving parts will not be produced. However, a locking arrangement which requires the operator to stop the vehicle, then manually connect or disconnect the drive hub of each front wheel, is very inconvenient. Thus, so-called automatic hubs have been provided, but do not overcome all of the problems. In such previous construction, a hub for each of the front wheels has been utilized in which a cam gear having scallops or grooves in its periphery is adapted to push a series of rollers, each disposed in one of the grooves, outwardly against a drive ring, so that when power is applied thruogh the front axles, the front wheels will be driven from the engine. The rollers are disposed in slots in a cage or retainer, while a circular spring extends around the rollers and engages a central slot in each roller. Also, a friction ring mounted on the end of the wheel spindle engages a leather ring which fits snugly around the friction ring and within an extension of the cage, to resist rotation of the cage and cause the wheels to be driven from the axle. However, such leather rings wear out readily and the expense of replacement is high. Also, since the construction is, in effect, a one-way clutch, due to the friction ring being mounted on the stationary spindle, in the event that the vehicle starts downhill the front wheels will overrun or run faster than their shafts, so that the front wheels will then produce no braking effect. This is a distinct disadvantage on steep hills, which are often encountered in terrain in which a four-wheel drive vehicle is used.

However, in some instances, purchasers desire the previous type of hub, but there is room for improvement therein, particularly in the sealing means therefor, as well as the general construction thereof.

Among the objects of the present invention are to provide an automatically operating hub for the optionally driven wheels of a four-wheel drive vehicle, normally the front wheels; to provide such a hub which will automatically cause the front wheels to be driven when the axles therefor are driven; to provide such a hub in which the front wheel will remain connected to the axle or shaft therefor when the latter is connected to the engine, so that a braking effect will be produced at each such wheel when the wheel tends to run faster than the shaft, such as when the vehicle is going downhill; to provide such a hub which will, nevertheless, permit the wheel to rotate freely with respect to its shaft when the shaft is not connected to the engine; to provide such a hub and a control system associated therewith which will cause the hub to automatically engage whenever the drive shaft for the hub is connected to the engine; to provide such a hub and control system which may be manually operated from within the vehicle; to provide such a hub and an electircal control system therefor; to provide such a hub and novel seals therefor which will protect the hub against leakage of grease from the wheel bearings and oil from the knuckle joint; to provide such a hub which is readily installed; to provide such a hub which will be efficient and effective in operation; and to provide improvements in the previous type of hub, particularly the sealing means therefor, as well as in the general construction thereof.

The foregoing and additional objects of this invention, as well as the novel features thereof, will become apparent from the description which follows, taken in connection with the accompanying drawings, in which:

FIG. 9 is an isometric view of a seal ring and plate;

FIG. 10 is an isometric view of an electrical slip ring;

FIG. 11 is a top plan view, on an enlarged scale, of a brush assembly;

FIG. 12 is a cross section taken along line 12—12 of FIG. 11;

FIG. 13 is a perspective view of an installation of one type of control switch on a conventional four-wheel drive vehicle;

FIG. 14 is a fragmentary cross section, otherwise similar to FIG. 4, but illustrating an alternative form of hub;

FIG. 15 is an angular, longitudinal section, taken along line 15—15 of FIG. 14, but showing the hub disengaged;

FIG. 16 is a front elevation, of a seal ring utilized in an alternative form of seal;

FIG. 17 is a vertical section taken along line 17—17 of FIG. 16;

FIG. 18 is a rear view of a seal plate of the alternative form of seal;

FIG. 20 is a fragmentary, enlarged section corresponding to a portion of FIG. 19;

FIG. 21 is a front elevation, on an enlarged scale, of an inner sealing ring of the hub of FIG. 19;

FIG. 22 is a side elevation of the sealing ring of FIG. 21;

FIG. 23 is a front elevation, on an enlarged scale, of an outer sealing ring of the hub of FIG. 19;

FIG. 24 is a cross section taken along line 24—24 of FIG. 23;

Figure 1:
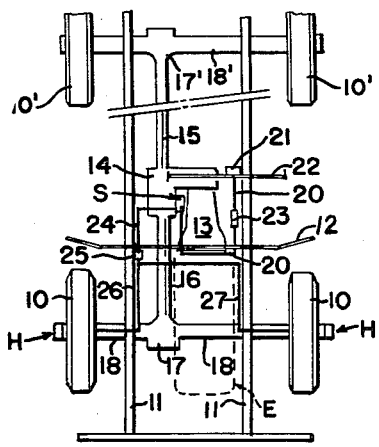
FIG. 1 is an electrical connection diagram of a preferred installation of automatically operating hubs installed on the front wheels, which are optionally driven, of a four-wheel drive vehicle shown diagrammatically.

As illustrated in FIG. 1, a pair of hubs H constructed in accordance with this invention are installed on the front wheels 10 of a four-wheel drive vehicle, such as of the "Willys Jeep" type, having a frame 11 on which is mounted an engine E, shown in dotted lines, forwardly of a fire wall 12, the engine being connected to a transmission 13, in turn connected to a transfer case 14, from which the rear wheels 10' may be driven through a rearwardly extending rear propeller shaft 15 and the front wheels optionally driven through a forwardly extending front propeller shaft 16. The front propeller shaft 16 is connected to a differential disposed within a differential housing 17, in turn driving front wheels 10 by axles disposed in housing sections 18 while rear propeller shaft 15 is connected to a differential disposed within a differential housing 17', in turn driving rear wheels 10' by axles disposed in housing sections 18'. The front wheels 10 are mounted on steering knuckles, which may be conventional and therefore are not shown, but are mounted on frame 11, while the front drive axle in each axle housing 18 is connected through a universal joint with a drive shaft which extends through a spindle on which the wheels rotate, as described later.

A switch S is installed, as on the transfer case 14 in the case of the vehicle referred to above, so as to be open when the front propeller shaft 16 is not connected with the engine but to be closed when a shift lever is moved to a position to cause the front propeller shaft 16 to be connected with the engine. One side of switch S is connected by a wire 20 with a suitable source of current, normally the battery of the vehicle, as at the ignition switch 21 which is mounted on the instrument panel 22. Wire 20, in which a fuse 23 may be installed, conveniently extends through fire wall 12 and then beneath the fire wall to switch S. The opposite side of switch S is connected to a wire 24, which conveniently extends to and then along one side of frame 11 to a connection 25, from which a wire 26 extends along the same side of the frame and to and through the brake backing plate for the corresponding wheel 10. From connection 25 another wire 27 extends across to the opposite side of frame 11, then up to and outwardly to the brake backing plate for the corresponding wheel 10. Conveniently, wires 20, 24, 25, 26 and 27 are taped or otherwise securely attached to stationary parts of the vehicle, wires 26 and 27 conveniently being taped to the brake hose, between the corresponding side of the frame and the brake backing plate for the particular wheel, so as to be supported by the brake hose while the wheel pivots about the knuckle joint during guiding of the vehicle around curves or corners. It will be evident that, with the preferred installation of switch S as shown, hubs H will be automatically engaged, in a manner described later, whenever the shift lever for the transfer case 14, or a corresponding shift lever of other four-wheel drive vehicles, is shifted so as to connect the front propeller shaft 16 with the engine. The circuit supplying electricity to hubs H for operation thereof, when switch S is closed, may be completed by grounding the opposite side of the electrical parts of the hub to a portion of the wheel which will, in turn, be connected to the ground connection of the battery through frame 11.

Figure 2:
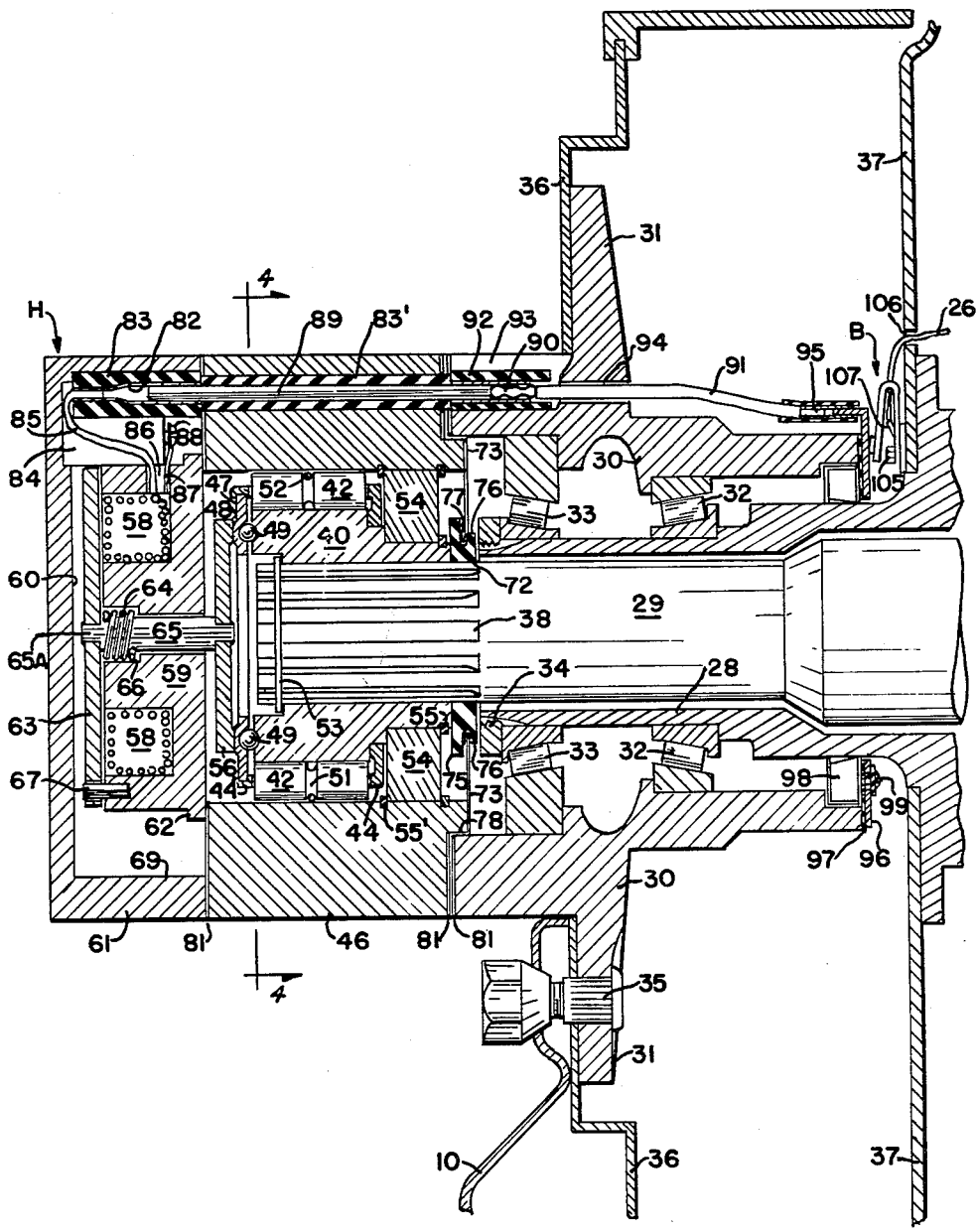
FIG. 2 is an axial cross section, taken through one of the hubs of FIG. 1 with the hub engaged and showing also a drive shaft for the wheel, a spindle, a brake drum and a brake supporting plate.

As shown in FIG. 2, the four-wheel drive vehicle referred to above is provided at a front wheel with the parts shown and other four-wheel drive vehicles will be provided with somewhat similar or corresponding parts, which include a spindle 28 which extends outwardly from a conventional knuckle joint for supporting the wheel for rotation and within which a drive shaft or axle 29 is disposed, for rotation when the front propeller shaft 16 of FIG. 1 is driven by the engine. The wheel hub 30, having a flange 31, rotates about the spindle 28 by means of two sets of roller bearings 32 and 33, the distance between which has been shortened for illustration purposes which are held in position by wheel flange 31 and a nut 34, or by a series of lock nuts and lock washers. The wheel 10 with a tire mounted thereon, is attached to hub flange 31 by a series of bolts 35. A brake drum 36 is mounted on wheel hub flange 31, while a brake backing plate 37 is mounted on spindle 28 and carries the brake shoes and other necessary parts to cause engagement of the brake shoes with the inside of brake drum 36, when hydraulic fluid is supplied under pressure to the brake hose. The end of the wheel drive shaft 29 is provided with splines 38, which are normally engaged by a drive flange which is connected to wheel hub 30 by bolts extending into a series of threaded holes 39, spaced circumferentially about wheel hub 30 and shown in FIG. 3. The automatic hub H replaces the drive flange described above.

Figure 3:
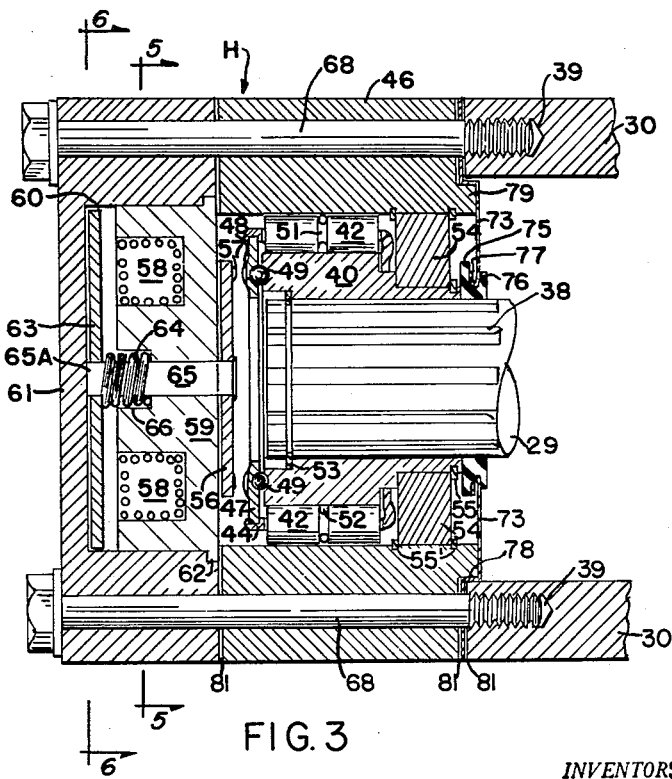
FIG. 3 is a fragmentary axial section, similar to a portion of FIG. 2, but with the hub disengaged and taken at a position spaced circumferentially from FIG. 2.
Figure 4:
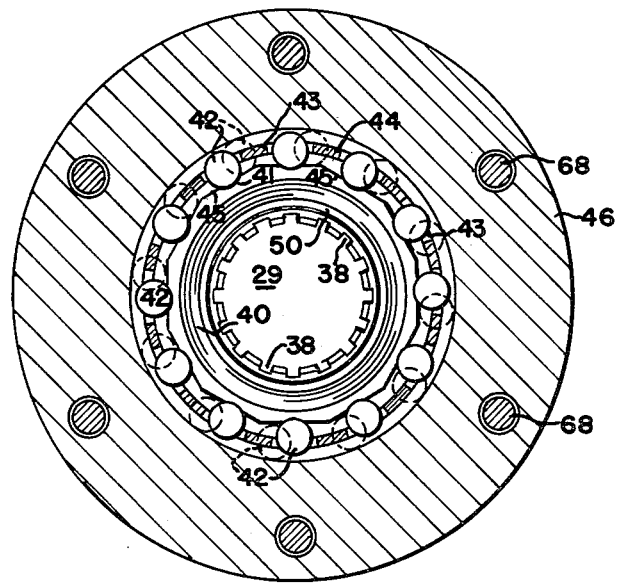
FIG. 4 is a cross section taken along line 4—4 of FIG. 2.
Figure 7:
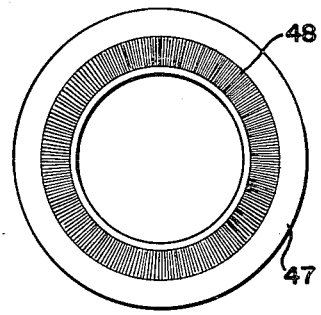
FIG. 7 is a front elevation of a bearing retainer and friction plate.

The hub H of this invention, as in FIGS. 2 and 3, includes a drive gear 40 provided with splines around its inner circumference which engage splines 38 on shaft 29 and is also provided, as in FIG. 4, with a series of grooves 41 in which a series of rollers 42 are normally disposed. Rollers 42 are also disposed in circumferentially spaced slots 43 in an annular cage 44, which if permitted to rotate frely, will permit rollers 42 to remain in grooves 41, as in the full positions of FIG. 4. However, if rotation of cage 44 in either direction is restricted, then the cage will force rollers 42 onto outwardly inclined surfaces 45, disposed at each side of each groove 41, thereby forcing rollers 42 outwardly and into engagement with the inner circumference of a drive ring 46, as in the dotted positions of FIG. 4. Cage 44 is provided with a friction ring 47 having on the outside an outwardly extending bulge 48 provided with radial serrations stamped therein, as in FIG. 7, and on the inside with an annular groove in which a series of balls 49 are placed, balls 49 rotating also in a corresponding groove 50 in the end of drive gear 40, shown in FIG. 4. Each roller 42 may also be provided with a central slot 51 in which a circular coil spring 52 is disposed, so as to extend around all of the rollers and hold the rollers in groove 41 until forced outwardly by engagement with a surface 45. Friction ring 47 is conveniently mounted on cage 44 by engagement with a shoulder formed on the inside of cage 44 and the edge of the cage rolled over against the edge of ring 47, or in any other suitable manner, while a snap ring 53, engaging a slot in shaft 29, holds drive gear 40 on the shaft. Free rotation between drive gear 40 and drive ring 46, when rollers 42 are disengaged, is also permitted by an oil impregnated, sleeve bearing 54, the inside of which engages the drive gear 40 and the edge of which engages a shoulder at the inner end of drive gear 40, as in FIG. 2. The outside of bearing 54 is pressed into the inside of drive ring 46, with the inner and outer edges of sleeve bearing 54 being held in position by snap rings 55 and 55'.

Figure 5:
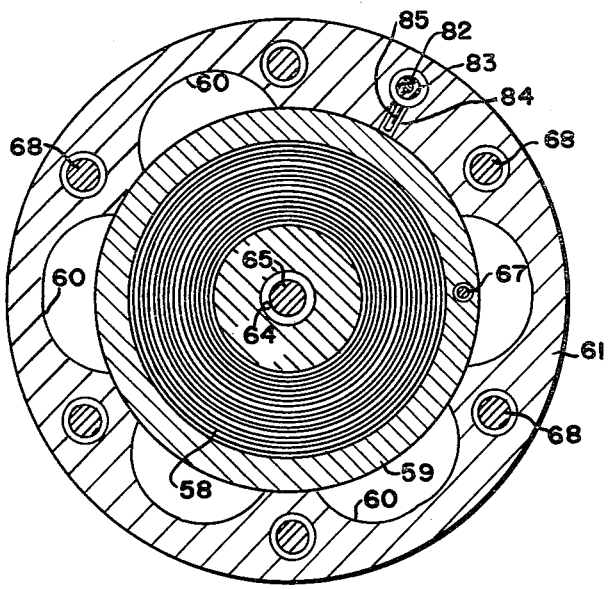
FIG. 5 is a cross section taken along line 5—5 of FIG. 3.
Figure 6:
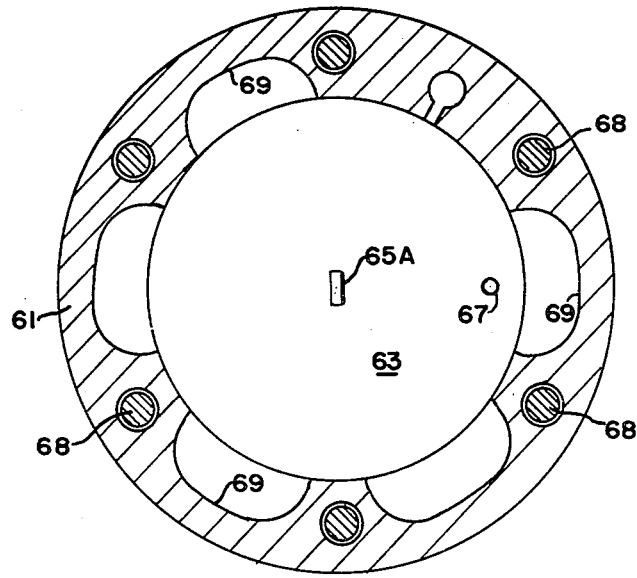
FIG. 6 is a cross section taken along line 6—6 of FIG. 3.
Figure 8:
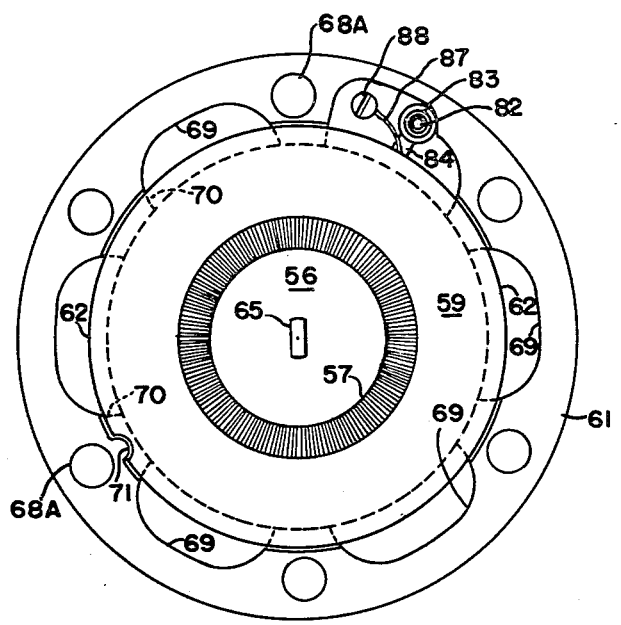
FIG. 8 is a front elevation of a magnet coil housing and parts therein.

Resistance to rotation of cage 44 is provided by a friction plate 56 having an outwardly offset series of serrations 57 adjacent its outer circumference, as in FIGS. 3 and 8, adapted to engage the serrations of bulge 48 of friction ring 47, as in FIG. 2. Friction plate 56 is moved toward friction ring 47 upon flow of current through a magnet coil 58, which is disposed in an annular well in a magnet body or core 59, in turn mounted in a well 60 in a magnet housing 61. Magnet core 59 may be provided with a peripheral flange 62, which engages a series of shoulders at the inner end of housing 61, so as to space the opposite end of the magnet core from the inside of well 60. In this space is disposed a plate 63 of magnetic material, normally moved by a spring 64 away from magnet coil 58 when current is not supplied thereto, as in FIG. 3, but which is moved toward coil 58, against the pressure of spring 64, when the coil is energized, as in FIG. 2. Magnetic plate 63 is connected with friction plate 56 by a pin 65 which extends through an axial hole in magnet core 59, provided with a well 66 for receiving spring 64, while each end of pin 65 is provided with flat sides engaging a correponding hole in magnetic plate 63, as in FIG. 6, and in friction plate 56, as in FIG. 8, with the ends of pin 65 conveniently being riveted over onto friction plate 56 and magnetic plate 63. The projecting ends of pin 65 have two flat sides to prevent rotation of friction plate 56 relative to magnetic plate 63, while the extending end 65a of pin 65 prevents plate 63 from engaging the inner end of well 60, in the position of FIG. 3, so that an oil film between the smooth surfaces of the inner end of well 60 and plate 63 will not cause plate 63 to adhere to the inner end of well 60 and thereby cause difficulty in the movement of plate 63 by the magnet coil 58 when energized. A pin 67 extends outwardly from magnet core 59 through a hole in the magnetic plate 63, as in FIGURES 2, 5 and 6, to prevent rotation of magnetic plate 63 with respect to the magnet core. Drive ring 46 and housing 61 are attached together and to hub 30 by cap bolts 68, as in FIG. 3, which extend through a circumferentially spaced series of holes, as in FIG. 5 and, as in FIG. 3, extend into the threaded holes 39 in hub 30, which normally accommodate the bolts attaching the drive flange between shaft 29 and wheel hub 30, as described previously. Housing 61 is conveniently formed of cast aluminum and, as in FIGS. 6 and 8, may be provided with a series of grooves 69 extending outwardly from well 60 between lands which accommodate holes 68a of FIG. 8 for cap bolts 68, to position core 59 but provide a minimum of contact area between housing 61 and core 59. Each land is provided with a shoulder 70 of FIG. 8 engaged by flange 62 of core 59, while one or more lands may be provided with an arcuate segment 71 and flange 62 with a corresponding groove to prevent rotation of core 59 with respect to housing 61. Oil from the knuckle joint on which spindle 28 is mounted, which normally includes a universal joint by which the wheel shaft 29 is connected to the drive shaft, or grease from bearings 33 and 32, might leak into hub H and collect in the hub and, particularly in cold weather, become stiff and thus cause the hub to engage when not desired, as by resisting free rotation of cage 44 or friction ring 47 or one of rollers 42.

In accordance with this invention, a seal as shown in FIGS. 2 and 3, or an alternative seal as shown in FIG. 15, is provided between wheel hub 30 and hub H. The seal of FIGS. 2 and 3 comprises a sealing ring 72 and an annular mounting plate 73, shown also in FIG. 9. Sealing ring 72 is provided with inner splines 74 engaging splines 38 of shaft 29 and spaced radial flanges 75 and 76 providing between them a groove engaging a flange 77 formed by the inturned, rounded inner edge of annular plate 73, so that plate 73 will rotate about sealing ring 72 when shaft 29 is not driven. Ring 72 is preferably formed of "neoprene" or other similar grease resistant, flexible material, and the thickness of ring 72 should be such that splines 74 thereof will prevent grease from leaking along splines 38, due to resilient engagement with the same, while the engagement of flange 77 with the groove between flanges 75 and 76 will prevent leakage of grease around the outside of ring 72. Flange 76 conveniently has a lesser diameter than flange 75 to facilitate inserting ring 72 in plate 73. Plate 73 is conveniently formed of light metal, such as aluminum, and is provided with a shoulder 78 to permit it to interfit between wheel hub 30 and drive ring 46, which is conveniently provided with a flange 79 extending within hub 30, as in FIG. 3. Plate 73, as in FIG. 9, is also provided with holes 80 for bolts 68 of FIGS. 3 and 4, while a gasket 81, as in FIGS. 2 and 3, may be inserted between housing 61 and drive ring 46, as well as on each side of plate 73.

Electric current is supplied to magnet coil 58 through a connection 82 of FIG. 2 which is disposed within an insulating bushing 83, disposed in the outer, circular end of a radial slot 84 in housing 61, as in FIG. 8, one end 85 of coil 58 extending to connection 82 through slot 84 and also outwardly through a hole 86 in magnet body 59. The opposite end 87 of magnet coil 58 may also extend outwardly through hole 86 and may be grounded to housing 61 by a screw 88 within a front lateral extension of slot 84 in the housing, as in FIGS. 2 and 8. As will be evident, cap bolts 68 ground housing 61 to wheel hub 30, so that end 87 of coil 58 will, in turn, be grounded to the frame and the ground terminal of the battery. A heavy wire 89 is mounted in an insulating bushing 83' disposed in a hole provided therefor in drive ring 46, and extends from opposite ends of ring 46, so as to be readily engageable with connection 82 and also to readily permit attachment of a connector 90, to which an insulated wire 91 is attached and which is within insulator 92 which is disposed in a valley 93 which, in the vehicle referred to above, is disposed between alternate lands in which bolt holes 39 are placed in wheel hub 30.

To supply current to insulated wire 91 from one of wires 26 or 27 of FIG. 1, a hole 94 is drilled through hub flange 31 at an appropriate position, so that wire 91 may extend to an insulated connector 95, by which wire 91 is connected to a slip ring 96 which is engaged by a brush B conveniently mounted on brake backing plate 37. Slip ring 96 is separated, by an insulating ring 97, from a special seal ring 98 forming a seal for bearings 33 and 32. Slip ring 96 and insulating ring 97 are attached to seal ring 98 by screws 99, disposed circumferentially and extending through insulating grommets. Slip ring 96, as in FIG. 10, may be provided with a series of holes 100 for the grommets and screws 99, as well as a laterally extending tab 101, to which wire 91 may be attached by connector 95 of FIG. 2.

Brush B, which conducts current to slip ring 96, is conveniently mounted on the brake backing plate 37 by two bolts 105 which assist in attaching the brake backing plate to spindle 28, as shown in FIG. 2, while wire 26 extends through a hole 106 drilled in brake backing plate 37 adjacent the position of the brush and is connected to brush B by an insulated connector 107. Brush B may be constructed as shown in FIGS. 11 and 12, thus comprising a base 108 formed of insulating material, on which is mounted an angular spring 109, such as formed of beryllium copper with one half attached to base 108 by rivets 110, as in FIG. 12 having countersunk heads on the underside of base 108. The opposite half of spring 109 is provided with a contact 111, such as formed of silver graphite and having a rounded contact face for engagement with slip ring 96. In addition, a tab 112 may be attached to spring 109 by one of rivets 110, for connecting the brush to one of the wires 26 or 27 of FIG. 1, through the insulated connector 107 of FIG. 2, while base 108 is provided with holes 113 for bolts 105 of FIG. 2. When installing the brush, care should be taken that little slack is left in the wire adjacent the brush, so that wire 26 or 27 is preferably first attached to the brush, then passed through hole 106 in the backing plate and then extended along the brake hose and the frame, then finally to connection 25 of FIG. 1.

As illustrated in FIG. 13, switch S may be provided with an operating lever 115 connected to a shift rod 116, which extends from the transfer case 14 and is actuated by a shift lever 117, so that when shift lever 117 is moved to move the shift rod 116, the actuating lever 115 of switch S will also be shifted, to move the switch from open to closed position whenever the engine is connected to the front propeller shaft 16 of FIG. 1. Switch S may be mounted on a bracket 118, in turn attached to transfer case 14 by a bolt 119 which may normally act as a ball check retaining bolt, but which thus serves a dual purpose. As will be understood, for other types of vehicles, particularly where the specific parts may differ, switch S may be connected to any suitable part, such as a shift rod or a shift lever, so that the switch may be automatically closed when the gear train or other drive arrangement is connected with the front propeller shaft. Conveniently, switch S is of a type which has sufficient leeway in its throw that it will not be damaged due to movement of the actuating element of the vehicle and also is preferably adjusted so that the drive to front propeller shaft 16 will be fully engaged before the switch is closed.

In an alternative embodiment of this invention, illustrated in FIGS. 14 and 15, a drive gear 125 may be internally splined, to engage splines 38 of wheel drive shaft 29 and be held in position by a washer 126, which engages a shoulder adjacent the front of drive gear 125 and is maintained in position by a screw 127. Drive gear 125 is provided with grooves 41 and surfaces 45, similarly to drive gear 40 of the previous embodiment, while a series of rollers 42 having slots 51 therein, in which a circular coil spring 52 is disposed, may again be normally disposed in grooves 41 and are similarly moved outwardly on surfaces 45, but by a pin 128 which is operated electromagnetically and is adapted to engage one roller 42 only. Rollers 42 are disposed in slots 43 of a cage 44', which is merely free to rotate with the rollers, but maintains them generally in grooves 41. Pin 128 may be provided with a core 129 disposed centrally within a magnet coil winding 130 and is normally held outwardly by a spring 131, as in FIG. 15, but when magnet coil 130 is energized, will be pulled downwardly against the force of spring 131, so as to intercept one of rollers 42, as in FIG. 14. When pin 128 engages one of rollers 42, as in FIG. 14, the rollers will be restricted in their rotation with shaft 29 and drive gear 125, whereupon the rollers will be forced outwardly by surfaces 45 at the adjacent sides of grooves 41, and into engagement with the inner periphery of a drive ring 132. For the purpose of installing magnet coil 130, pin 128 and associated parts, an arcuate angular cap 133, substituted for a portion of drive ring 132, may be attached to the drive ring by bolts 134 and may include a central well or hole 135 in which magnet body 129 moves, surrounded by a lateral angular extension in which coil winding 130 is disposed. A continuation of hole 135 is provided in drive ring 132, with a lip 136 being formed adjacent the inner end of the hole to provide an abutment for spring 131. The end of the hub may be closed by an end plate 137 which, if desired, may be made integral with the drive ring 132, while current to magnet coil 130 may be supplied through an insulated wire 138, which again may extend through the wheel hub to a slip ring, to which current may be supplied by a brush mounted on the brake backing plate, as in the manner illustrated and described previously in connection with FIG. 2, although any other suitable manner of supplying current to the magnet coil winding 130 may be utilized. The opposite end 139 of the wire of magnet winding 130 may be grounded to drive ring cap 133 by a screw 140, as in FIG. 14. The hub of FIGS. 14 and 15 may be attached to the wheel hub by cap bolts 68', as in a manner similar to that of the previous embodiment, while a sleeve bearing 54, held in place by snap rings as before, may be interposed between drive gear 125 and drive ring 132.

The seal shown in FIG. 15 includes a seal ring 150 formed of resilient, oil and grease resistant material, such as "neoprene," and an annular plate 151, conveniently metallic, which is engaged by seal ring 150 and also provides a space through which pressure of oil produced during rotation of the differential gears or of the universal jonit by which shaft 29 is normally connected to the drive shaft, may be relieved into the bearing space. Seal ring 150, as also shown in FIGS. 16 and 17, is provided with inner splines 152 which conveniently correspond in shape to and engage splines 38 on wheel shaft 29, and also with an angular, outer flange 153 having a bead 154 around its outer edge. Bead 154 is conveniently circular in cross section and engages the inner edge of sleeve bearing 54 to produce a minimum of resistance to rotation of the automatic drive hub with respect to wheel drive shaft 29, when the latter is not driven. Seal ring 150 is produced with flange 153, as in FIG. 17, extending at an angle of the vertical, such as 45°, which is greater than the angle at which the end of the flange extends to the vertical when the seal ring 150 is assembled with the hub, such as 30° as shown in FIG. 15. Annular plate 151, also shown in FIG. 18, is provided with inner splines 155 which conform in shape to and engage splines 38 on wheel shaft 29, and is also provided with a series of projections 156, which extend to the inside and engage the end of spindle 28 to produce a minimum of resistance to rotation while forming a space at the end of the spindle for the relief of oli pressure, as described above. The space provided by projections 156 need not be great, as on the order of 0.015 inch. Projections 156 are conveniently produced by indenting the plate 151 on the outside at spaced points, so that the projections will be formed on the inside, or may be formed in any other suitable manner. As will be evident, the seal of FIGS. 15 to 18 may be substituted for the seal of FIGS. 2, 3 and 9 in the embodiment previously described, while the seal of FIGS. 2, 3 and 9 may be utilized in the embodiment of FIG. 15.

Figure 19:
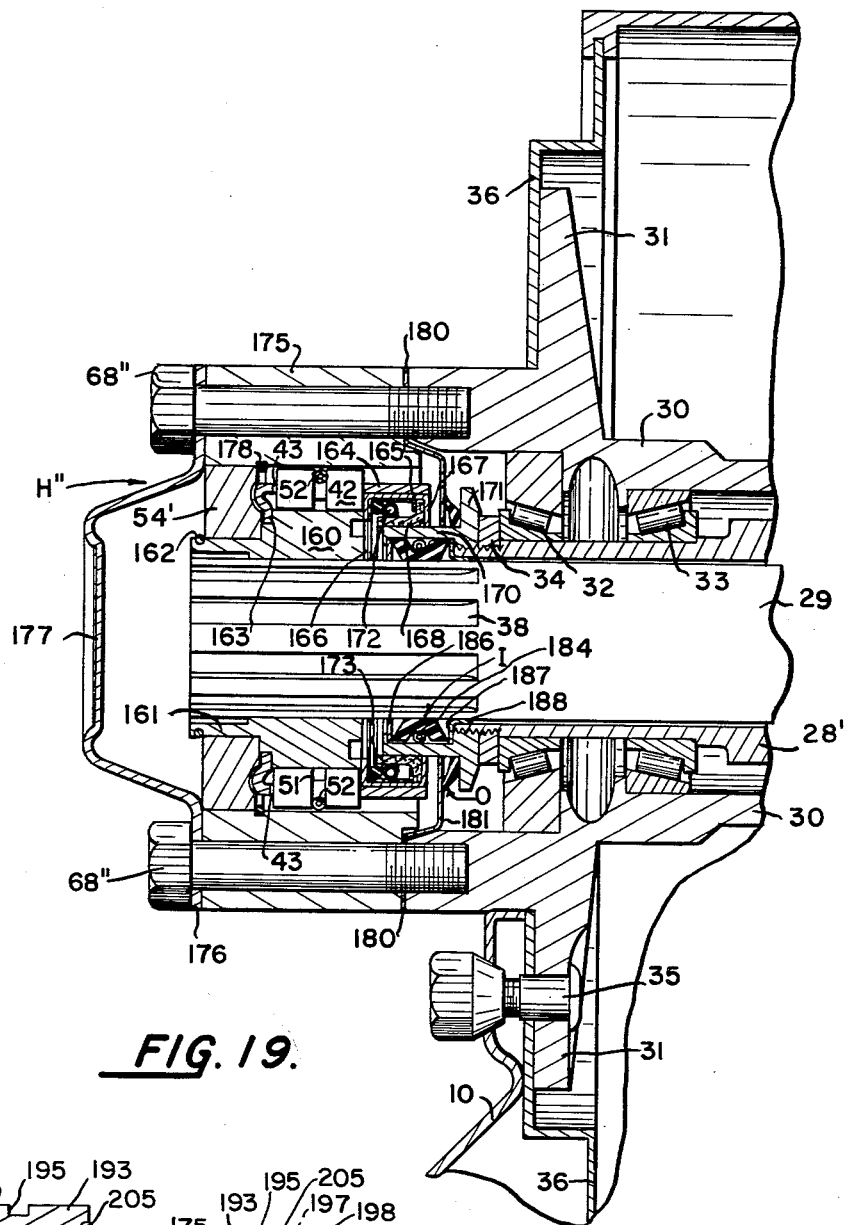
FIG. 19 is an axial cross section, similar to FIG. 2, but showing the improvements of this invention in the previous type of hub.

In the improved hub H" of the previous type, illustrated in FIG. 19, a drive gear 160 is provided with internal splines which engage splines 38 of wheel drive shaft 29 and is also provided with a bearing flange 161 engaging a sleeve bearing 54', held in position by a snap ring 162. Drive gear 160 is provided with grooves 41 and surfaces 45, similarly to drive gear 40 as shown in FIG. 4, while a series of rollers 42 having slots 51 therein receiving a circular coil spring 52, may again be normally disposed in grooves 41 and are similarly moved outwardly on surfaces 45, through resistance to rotation of a cage 163 having slots 43 in which rollers 42 are disposed. Cage 163 is provided with an axial flange 164, on the inside of which is mounted, as by a press fit, a ring 165 having spaced, inwardly extending flanges 166 and 167, while the lateral edge of an angular friction washer 168, as also shown in FIG. 20, is clamped against flange 167 by an inwardly extending flange of a ring 169, similar to ring 165 but fitting within the same. Conveniently, flange 166 of ring 165 is formed after washer 168 and ring 169 have been inserted in ring 165, so that a substantial clamping force can be exerted against washer 168 and flange 166 then rolled down against the opposite flange of ring 169. In addition, flange 167 may be staked against washer 168 by a series of indentations disposed circumferentially around flange 167. The inside of the axial portion of washer 168 frictionally engages an axial flange 170 of a lock nut 171 for nut 34. Thus, lock nut 171 engages the threads at the outer end of spindle 18', also engaged by nut 34 which holds in position bearings 32 and 33 for wheel hub 30. As before, hub 30 has flange 31 to which wheel 10, having a tire thereon, is attached by a series of bolts 35, and a brake drum 36 may be mounted on flange 31.

Washer 168 is conveniently formed of treated leather, so that when the cage 163 and the washer are stationary, a maximum of frictional resistance will be produced when drive shaft 29 is rotated, to cause rollers 42 to be moved outwardly upon resistance to rotation of cage 163. Either the fluid naturally in leather or the special fluid with which the leather is impregnated will, however, upon continued rotation of washer 168, exude to the inner surface of the washer, thereby permitting slippage of the washer on flange 170. This effect is accentuated by the pressure of a coil spring 172, which presses the axial portion of washer 168 against flange 170, while coil spring 172 is maintained in position on friction washer 168 by an O-ring 173 within ring 169, or in any other suitable manner. Thus, with coil spring 172 always pressing washer 168 against flange 170, maximum friction will be produced when the washer starts to rotate, but the washer will start to slip after a relatvely short period of rotation and wear on the washer will thus be minimized. Thus, one feature of this embodiment of the invention is the manner in which the friction washer is installed. Disc 186 is conveniently attached to flange 170 as in FIG. 20, by engagement with a shoulder 189, formed inwardly from the end of flange 170, and the end of flange 170 rolled over onto the edge of the disc.

When rollers 42 are moved outwardly, they engage the inner circumfarence of a drive 175, which is attached to hub 30 by a series of bolts 68', which also engage a flange 176 of an end cap 177, to secure the latter in position. When rollers 42 are not engaged, drive ring 175 rotates about bearing 54', which is held in position against drive ring 175 by a snap ring 178, or in any other suitable manner. As will be evident, when rollers 42 are disengaged, drive gear 160 and rollers 42, as well as lock nut 171 and friction washer 168, will remain stationary with shaft 29 and spindle 28, respectively, while drive ring 175 is permitted to rotate with hub 30 on bearing 54'. However, when shaft 29 is rotated, as through the transmission 14 of FIG. 1, the friction produced by friction washer 168 against flange 170 will resist rotation of cage 163, thereby causing rollers 42 to move onto the inclined surfaces and engage the inside of drive ring 175, to cause the hub 30 and wheel 10 to be driven from shaft 29.

Another feature of this embodiment is the sealing means which prevents leakage into hub H″ of the grease for wheel bearings 32 and 33 or oil from the shaft 29. As indicated previously, such leakage of oil or grease into hub H″ and particularly to rollers 42, is disadvantageous in that such oil or grease may tend to become stiff in cold weather, thus causing rollers 42 to rotate with drive ring 175 when shaft 29 is not driven, thereby causing the wheel to be locked to shaft 29 and rotate shaft 29 and associated parts, back to the transmission. This not only reduces power, but causes undue wear of such parts.

The sealing means of this invention includes an inner seal ring I and an outer seal ring O, the former sealing within flange 170 and the latter against an offset disc 180, the outer portion of which is clamped between drive ring 175 and hub 30, while an offset inner flange 181 of which encircles flange 170, with a slight clearance. As also shown in FIGS. 21 and 22, the inner seal ring I is provided with inner splines 182, which interfit with splines 38 of shaft 29, and is provided with an outer groove 183 receiving a coil spring 184. Seal ring I is generally trapezoidal in cross section, as in FIG. 19, thereby providing outwardly extending lips 185. When seal ring I is installed, it is compressed axially within a space bounded at opposite sides by a disc 186 mounted at the end of flange 170, and an angular ring 187 conveniently having an axial flange 188 which extends axially into the space between spindle 28' and shaft 29 and a radial flange which bears against the end of spindle 28'. Disc 186 is conveniently attached to flange 170, as in FIG. 20, by engagement with a shoulder 189, formed inwardly from the end of flange 170, and the end of flange 170 rolled over onto the edge of the disc. The width of inner seal ring I is conveniently such that, during installation, final tightening of lock nut 171 will compress ring I axially, so that lips 185, as in FIG. 20, will bear against disc 186 and ring 187, respectively. Also, the radial thickness of ring I should be such that, even after axial compression, a clearance of several thousands of an inch will be provided between the outer surface of ring I and the inner surface of flange 170, as shown in FIG. 20, so that these surfaces will not rub to produce undue heating and destruction of ring I and the only rubbing engagement of ring I will be with the flexible lips 185. Thus, ring I will provide an effective seal against leakage, since splines 182 of ring I will be held in engagement with splines 38 of shaft 29 by coil spring 184, while lips 185 will seal against disc 186 and ring 187 through axial compression of the ring.

As in FIGS. 23 and 24, outer seal ring O includes an inner annular portion 190, which fits tightly over flange 170 and bears against lock nut 171, and an angularly extending, outwardly tapering lip 191 which is flexible and will bend to the dotted position of FIG. 24 upon axial compression. Conveniently, the size and proportions of ring O are such that there will be some axial compression when installed, so that the position of lip 191 assumed after installation will be intermediate the full and dotted positions of FIG. 24, as in FIG. 20, although axial compression to the dotted position of FIG. 24 is unobjectionable. As will be evident, pressure of grease or oil against ring I will cause lip 191 to bear more firmly against flange 181 of disc 180. Since wheel hub 30 rotates while spindle 28' does not, ring O will remain stationary with lock nut 171, but lip 191 will form an effective seal in the manner indicated above and the resiliency of lip 191 will prevent undue wear.

Figures 25, 26:
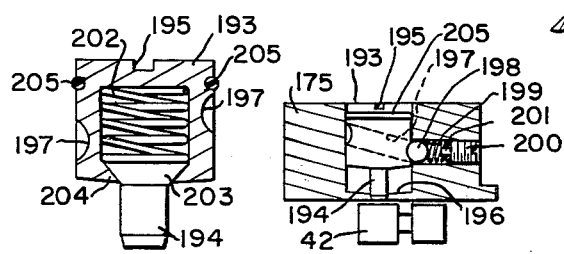
FIG. 25 is a fragmentary, axial cross section corresponding to a portion of FIG. 19 but taken at a different position.
FIG. 26 is an axial cross section, on an enlarged scale, of a manual engagement device shown in FIG. 25.

In the event that it is desired to cause the hub to connect each wheel to the drive axle for rotation in both directions, so that the wheel will not only be driven through the engine but engine compression may be used for braking effect, a manually actuated locking arrangement may be utilized. Such an arrangement may be disposed between two of the bolts 68″ of FIG. 19 and, as in FIG. 25, include a button 193 from the inner end of which a pin 194 projects, for engagement with a roller 42 when moved inwardly, as by twisting button 193 through 180° by insertion of a screw driver in a slot 195 in its outer end. Button 193 is disposed in a radial hole in drive ring 175 provided with an inner lip 196 to limit inward movement of the button, while button 193 is provided with a groove 197 extending angularly around the button and engaging a ball 198, which is disposed in an axial bore in drive ring 175 and is pressed toward the button by a coil spring 199, in turn held in place by a set screw 200 having an extending pin 201 which fits within one end of the spring. As will be evident, when button 195 is turned, as in a clockwise direction from the position of FIG. 25, groove 197 will move button 193 inwardly through engagement with ball 198 until ball 198 reaches the opposite end of groove 197. Groove 197 is conveniently 180° in extent and each end is preferably provided with an enlargement to receive ball 198 more fully, so that the operator will know, by the click thus produced, that one or the other end of groove 197 has been reached. The angularity of groove 197 is conveniently such that the inner end of pin 194, in the position of FIG. 25, will be flush with the inside of drive ring 175, but will extend to approximately the center of a roller 42 when button 193 is moved to its innermost position. As will be evident, when pin 194 is thus moved inwardly it will prevent the adjacent roller 42 from rotating relative to drive ring 175, thereby causing the rollers to move outwardly on the inclined surfaces of the drive gear 160.

Normally, pin 194, when moved inwardly, will be between two rollers 42 or will engage the side of a roller 42 and shift the rollers slightly in moving to its extended inner position. However, should pin 194 engage the top of a roller 42, a spring 202 of FIG. 26 permits pin 194 to be pushed into button 193 until the vehicle is again started and pin 194 can move between two rollers. Pin 194 is preferably formed of hardened steel and is provided with a beveled inner end and a conical head 203, received in the hollow interior of button 193 and against which spring 202 bears. For assembly purposes, spring 202 and head 203 of pin 194 are inserted in the bore of button 193, then the inner end of the button swaged or stamped inwardly to form a lip 204, which secures pin head 203 within the button. For sealing purposes, to prevent the entrance of dirt or the like into groove 197, an O-ring 205 is installed in a suitable groove adjacent the outer end of button 193.

From the foregoing, it will be evident that the hubs of this invention fulfill to a marked degree the requirements and objects hereinbefore set forth. As will be evident, in certain embodiments hubs will automatically cause the optionally driven wheels of a vehicle, normally the front wheels, to be driven when the axles therefor are driven. Since the resistance to rotation of the rollers, which connect a drive gear with the drive ring, is effected through the hub rather than through a stationary spindle, the hubs of FIGS. 1–18 will be operative in either direction and therefore will produce a braking effect when the wheel tends to run faster than the shaft, such as when the vehicle is going downhill. However, when the hubs are not engaged, the wheel is permitted to rotate freely with respect to its shaft, particularly when the drive shaft for the wheels is not connected to the engine. When the switch for actuating the hubs is connected to a movable portion of the mechanism which causes the drive shaft for the optionally driven wheels to be connected with the engine, the hubs will be automatically engaged whenever the propeller shaft for the wheels is connected to the engine. An electrical control system for the hubs is particularly advantageous, since it permits the hubs to be automatically operated from the transfer case or similar part of the vehicle, or may be operated by the operator through a switch mounted on the instrument panel or dash board. The advantage of automatic operation is evident, although optional operation by the operator, through a switch mounted on the instrument panel, has certain advantages. For instance, if the vehicle is moving and the opertaor wishes to shift into four wheel drive, it is normally necessary to stop the vehicle, before shifting into four wheel drive, since the front propeller shaft will be stopped and it is normally necessary also to cause the rear propeller shaft to be stopped, before shifting gears or a splined clutch arrangement to connect the engine with the front propeller shaft. However, with the hubs illustrated, when the switch is mounted on the instrument panel, the operator may merely close the switch to cause the hubs to engage automatically, so that the front wheels will then cause the front propeller shaft to rotate at an equivalent speed to the rear propeller shaft, whereupon the vehicle may be shifted into four wheel drive without stopping the same. Although it is recommended that such shifting into four wheel drive be made at fairly low speeds, such as 15 m.p.h. or less, hubs constructed in accordance with this invention have been successfully utilized in shifting into four wheel drive at speeds up to 70 m.p.h., without clashing of gears or damage to any parts. The novel seals illustrated, which prevent leakage of oil from the knuckle joint or grease from the bearings into the automatic hub, are of simple construction yet operate effectively. In particular, in one form, the use of spaced flanges of a resilient seal ring which engages the splined shaft and between which flanges a rounded inner edge of a sealing plate is disposed, permits the plate and therefore the hub to which it is connected to rotate freely with respect to the seal ring.

In another form, the use of a flexible seal ring having an annular outer flange and a bead around the outer edge of the outer flange, together with splines on the inner circumference, permit the seal ring to remain stationary with the wheel shaft, when the wheel shaft is not driven, the bead providing a minimum of contact area with the hub, such as the end of a sleeve bearing, and the angular flange permitting the seal ring to be pressed against the hub in the event that oil pressure develops due to rotation of differential gears or a universal joint. Also, an annular plate provided with lateral projections and with splines around its inner circumference, permits the plate to rotate with respect to the spindle and also provides a space which will relieve oil pressure into the bearing space about the spindle.

As will be evident, the hubs of FIGS. 1–18 of this invention are readily installed, since such installation requires only the drilling of a single hole in the wheel hub and a single hole in the brake backing plate, in the type of vehicle referred to previously. Although in the case of the type of vehicle referred to previously, two longer bolts are substituted for two of the bolts which attach the brake backing plate to the spindle and longer bolts replace the bolts which normally attach the drive flange to the wheel hub, such bolts are readily substituted. The use of a relatively heavy insulated wire, extending through the drive ring and outwardly from each end thereof, permits the portions of the hub to be readily assembled on the vehicle, since the extending ends of the heavier wire engage electrical connectors, one within the magnet housing and the other on the end of the wire which extends through the wheel hub. Of course, in the embodiment of FIGS. 14 and 15, such a connection is unnecessary, since a part of the drive ring forms the magnet housing.

As will also be evident, in the embodiment of FIGS. 19–24, the inner and outer seal rings, each of which is provided with flexible lips engaging a radial surface, provide an effective seal to prevent the entrance of grease or oil into the cage and rollers but readily permit relative rotation between the seals and the radial surfaces engaged by the lips. In addition, the resilient means holds the inner seal in engagement with the splines, while the flanged lock nut, when tightened, causes the radial surfaces to be squeezed against the lips of the inner seal. Resilient means forcing the friction washer against the flange assists materially in the effective operation of the hub, while the flanged rings clamping the washer simplifies the construction and also provide space for the coil spring and the additional member, such as an O-ring, which maintains the coil spring in position.

Although a preferred embodiment and additional embodiments of this invention have been illustrated and described and certain variations therein indicated, it will be understood that other embodiments may exist and that other variations may be made, all without departing from the spirit and scope of this invention.

What is claimed is:

1. A hub for connecting an optionally driven wheel of a vehicle to a shaft, comprising an outer drive ring attached to said wheel; an inner drive gear mounted on said shaft for rotation therewith; a series of rollers disposed in circumferentially spaced relation between said drive gear and said drive ring, said drive gear having grooves in which said rollers are normally disposed and inclined surfaces for forcing said rollers against said drive ring; a cage for maintaining said rollers in spaced positions and provided with an annular, generally flat ring; and a generally circular friction plate movable axially into engagement with said flat ring for resisting rotation of said cage and causing each roller to engage an inclined surface and said drive ring.

2. A hub as defined in claim 1, including electromagnetic means connected to said drive ring for moving said friction plate into engagement with said flat ring.

3. A hub as defined in claim 2, wherein said electromagnetic means includes an annular core formed of magnetic material and disposed axially with respect to said friction plate, said core having an annular space receiving an electrical coil on the side opposite said friction plate; a circular plate formed of magnetic material on the side of said core adjacent said coil; and a pin extending axially through said core and connecting said magnetic plate with said friction plate.

4. A hub as defined in claim 1, wherein said flat ring and plate are provided with projections for engagement with each other when said plate is moved into engagement wiht said flat ring.

5. A hub as defined in claim 4, wherein said flat ring is provided with an annular bulge with said projections on the convex side of said bulge and the concave side of said bulge has an arcuate cross-section; and a series of balls engaging the concave side of said bulge, the end of said inner drive gear being adjacent said flat ring and having an annular groove of arcuate cross-section engaged by said balls.

6. A hub for connecting an optionally driven wheel to a shaft of a vehicle having a stationary spindle, and a member having a cylindrical flange extending from and operatively connected to said spindle, comprising an outer drive ring rotatably fixed to said wheel; an inner drive gear mounted on said shaft for rotation therewith; a series of rollers between said drive gear and drive ring; a cage for maintaining said rollers in spaced positions; one of said drive gear and drive ring having means for causing said rollers to drive said ring from said gear upon resistance to rotation of said cage; a friction washer connected to said cage and bearing against said flange for resisting rotation of said cage; and a spring surrounding said washer for forcing said washer against said flange.

7. A hub as defined in claim 6, including a first ring having an inwardly extending flange at each end and connected to said cage; a second ring having an inwardly extending flange at each end and disposed within said first ring, said washer having an angularly disposed edge clamped between corresponding flanges of said first and second rings; and a member disposed within said second ring adjacent the opposite flange thereof for maintaining said spring in position on said washer.

8. A hub for connecting an optionally driven wheel to a shaft of a vehicle having a hollow stationary spindle through which said shaft extends and the extending end of said shaft having splines, comprising an outer drive ring rotatably fixed to said wheel; an inner drive gear mounted on said shaft for rotation therewith; a series of rollers between said drive gear and drive ring; a cage for maintaining said rollers in spaced positions; one of said drive gear and drive ring having means for causing said rollers to drive said ring from said gear; said spindle having means providing generally radial surfaces at longitudinally spaced positions; and a seal ring formed of resilient material, having inner splines engaging said shaft splines and annular, laterally extending lips engaging said radial surfaces.

9. A hub as defined in claim 8, in which said ring is provided with a circumferential groove in the outer face thereof; and a spring within said groove holds said seal ring against said shaft.

10. A hub as defined in claim 9, wherein said means providing radial surfaces includes a member mounted on said spindle and having a cylindrical flange surrounding in spaced relation a portion of said shaft splines; a flange extending inwardly from adjacent the outer end of said cylindrical flange to provide one radial surface; and a ring having a radial flange abutting the end of said spindle, to provide another radial surface, and a thin cylindrical flange extending between said shaft and said spindle.

11. A hub for connecting an optionally driven wheel to a shaft of a vehicle provided with a stationary spindle through which said shaft extends, comprising an outer drive ring attached to said wheel; an inner drive gear mounted on said shaft for rotation therewith; a series of rollers between said drive gear and drive ring; a cage for maintaining said rollers in spaced positions; means for causing said rollers to drive said ring from said gear; said shaft having means forming adjoining radial and circumferential surfaces at the end of said spindle; a plate extending inwardly from the inner edge of said outer drive ring; and a sealing disc of resilient material having an inner annular portion, bearing against said radial surface and engaging said circumferential surface, and an outwardly tapering lip bearing against said plate.

12. A hub as defined in claim 11, wherein the means forming adjoining radial and circumferential surfaces comprises splines extending to the outer end of said shaft; the outer edge of said tapered lip of said resilient disc is provided with a bead; and said hub further includes an annular plate between said resilient disc and said spindle, said annular plate having inner splines engaging said shaft splines and a series of circumferentially spaced projections engaging the end of said spindle to provide a space between said annular plate and said spindle.

13. A hub for connecting an optionally driven wheel to a shaft of a vehicle having a hollow spindle through which said shaft extends, said wheel having a hub rotatably mounted on said spindle and the extending end of shaid shaft having splines, comprising an outer drive ring attached to said wheel; an inner drive gear mounted on said shaft for rotation therewith; a series of rollers between said drive gear and drive ring; a cage for maintaining said rollers in spaced positions; means for causing said rollers to drive said ring from said gear; a ring formed of resilient material having inner splines engaging said shaft splines and a circumferential groove in the outer edge; and an annular plate having an inner edge engaging said groove and an outer edge extending between said wheel hub and said outer drive ring, said resilient ring and said annular plate forming a seal between said wheel and spindle and said drive gear and drive ring.

14. A hub for an optionally driven wheel of a vehicle having an engine and means for selectively connecting said engine with said wheel through a shaft disposed centrally of said wheel, said vehicle having a hollow spindle through which said shaft extends and said wheel having a hub rotatably mounted on said spindle, the extending end of said shaft having splines, said vehicle being provided with a brake backing plate, said wheel having bearings between said spindle and said wheel hub and said wheel hub being provided with a grease seal for said bearings, said hub comprising an outer drive ring attached to said wheel hub; an inner drive gear mounted on the extending end of said shaft for rotation therewith; a series of rollers disposed in circumferentially spaced relation between said drive gear and said drive ring, said drive gear having grooves in which said rollers are normally disposed and inclined surfaces for forcing said rollers against said drive ring; a cage for maintaining said rollers in spaced position, said cage having an annular, generally flat ring disposed at the end of said shaft; a magnet housing attached to said outer drive ring; an annular core disposed axially within said housing and having an annular space receiving an electrical coil on the side opposite said shaft; a circular plate formed of magnetic material on the side of said core adjacent said coil; a pin extending axially through said core and connected to said magnetic plate, said pin having an extended end forming a stop for said magnetic plate to prevent contact thereof with the inside of said housing; a generally circular friction plate mounted on the opposite end of said pin and movable axially into engagement with said flat ring, said friction plate being provided with projections for engagement with said flat ring and said flat ring being provided with an annular bulge having projections on the convex side for engagement with the projections of said friction plate, the concave side of said bulge having an arcuate cross-section; and a series of balls engaging the concave side of said bulge, the end of said inner drive gear having an annular groove of arcuate cross section engaged by said balls.

15. A hub for an optionally driven wheel of a vehicle having an engine and means for selectively connecting said engine with said wheel through a shaft disposed centrally of said wheel, said vehicle having a hollow spindle through which said shaft extends and said wheel having a hub rotatably mounted on said spindle, the extending end of said shaft having splines, said wheel having bearings between said spindle and said wheel hub, said hub comprising an outer drive ring attached to said wheel hub; an inner drive gear mounted on the extending end of said shaft for rotation therewith; a series of rollers disposed in circumferentially spaced relation between said drive gear and said drive ring, said drive gear having grooves in which said rollers are normally disposed and inclined surfaces for forcing said rollers against said drive ring; a cage for maintaining said rollers in spaced position; a magnet coil disposed in said outer drive ring; and a pin movable into engagement with one of said rollers upon energization of said coil.

16. A hub for connecting an optionally driven wheel of a vehicle to a shaft, said vehicle having a stationary spindle through which said shaft extends and said wheel having a hub mounted for rotation on said spindle, comprising an outer drive ring rotatably fixed to said wheel; an inner drive gear mounted on said shaft for rotation therewith, said shaft having splines; a series of rollers disposed in circumferentially spaced relation between said drive gear and said ring, said drive gear having grooves in which said rollers are normally disposed and inclined surfaces for forcing said rollers against said drive ring; a cage for maintaining said rollers in spaced position; an optionally inwardly movable pin mounted in said drive ring for engaging one of said rollers to resist rotation of said rollers and said cage and cause each roller to engage an inclined surface and said drive ring; an axial flange mounted on the end of said spindle to surround said shaft in spaced relation and having a radial flange at the inner end thereof; a plate extending inwardly from said wheel hub to a position spaced from said radial flange; a first seal ring engaging said axial and radial flanges at the juncture thereof and having a flexible, outwardly extending lip engaging said plate; a ring mounted on the inside of said cage in spaced relation to said rollers and having an inwardly extending flange surrounding said axial flange; a friction washer engaging the outside of said axial flange and said inwardly extending flange; a coil spring surrounding said friction washer; a radially and inwardly extending disc mounted adjacent the outer end of said axial flange, in spaced relation to the end of said spindle; an angular ring engaging the end of said spindle within said axial flange and extending into the space between said spindle and said shaft; a second sealing ring having inner splines engaging said shaft splines and flexible laterally extending lips, respectively engaging said disc and said angular ring, said second ring having a groove in the outer surface thereof; and a coil spring disposed in said groove of said second sealing ring.

17. A hub for connecting an optionally driven wheel of a vehicle to a shaft, comprising an outer drive ring attached to said wheel; an inner drive gear mounted on said shaft for rotation therewith; a series of rollers disposed in circumferentially spaced relation between said drive gear and said drive ring; said drive gear having grooves in which said rollers are normally disposed and inclined surfaces for forcing said rollers against said drive ring; a cage for maintaining said rollers in spaced positions; and a pin movable radially inwardly for engagement with one of said rollers for resisting rotation of said cage and causing each roller to engage an inclined surface and said drive ring.

18. A hub as defined in claim 17, including electromagnetic means for moving said pin inwardly.

19. A hub for an optionally driven wheel of a vehicle having a spindle with a brake backing plate mounted thereon, bearings between said spindle and said hub, an engine and means for selectively connecting said engine with said wheel through a shaft disposed centrally of said wheel and extending through said spindle, said hub comprising means including a switch for selectively connecting said wheel with said shaft; electromagnetically operating means for causing said selective connection means between said wheel and said shaft to become operative; a grease seal for said bearings mounted on said spindle; a slip ring mounted on said grease seal, insulated therefrom and electrically connected to said operating means; a brush mounted on said brake backing plate, including a base formed of insulating material; an angular spring having one arm attached to said base and a contact engaging said slip ring and mounted on the other arm of said spring; and an electrical circuit including said switch for supplying current to said brush to energize said operating means.

20. A hub for connecting an optionally driven wheel of a vehicle to a shaft, said vehicle having a hollow spindle through which said shaft extends and said wheel having a hub rotatably mounted on said spindle, the extending end of said shaft having splines; said hub comprising an outer drive ring attached to said wheel and having a shoulder extending within said wheel hub; an inner drive gear mounted on said shaft for rotation therewith; a series of rollers disposed in circumferentially spaced relation between said drive gear and said ring, said drive gear having grooves in which said rollers are normally disposed and inclined surfaces for forcing said rollers against said drive ring; a cage for maintaining said rollers in spaced positions; means connected to said drive ring for resisting rotation of said cage and causing each roller to engage an inclined surface and said drive ring; a seal ring formed of resilient material having inner splines engaging said shaft splines and a circumferential groove in the outer edge thereof, said groove having a generally arcuate inner edge; and an annular plate having an inner, generally arcuate flange engaging said groove and an outer edge extending between said wheel hub and said outer drive ring, including a shoulder engaging said drive ring shoulder, said seal ring and plate providing a seal between said wheel hub and spindle and said drive gear and drive ring.

21. A hub for connecting an optionally driven wheel of a vehicle to a shaft, said vehicle having a hollow spindle through which said shaft extends and said wheel having a hub rotatably mounted on said spindle, the extending end of said shaft having splines; said hub comprising an outer drive ring attached to said wheel; an inner drive gear mounted on said shaft for rotation therewith; a series of rollers disposed in circumferentially spaced relation between said drive gear and said ring; said drive gear having grooves in which said rollers are normally disposed and inclined surfaces for forcing said rollers against said drive ring; a cage for mounting said rollers in spaced positions; means connected to said drive ring for resisting rotation of said cage and causing each roller to engage an inclined surface and said drive ring; a seal between said wheel hub and spindle and said drive ring and drive gear comprising a seal ring formed of resilient material having inner splines engaging said shaft splines and an outer flange extending angularly into engagement with the end of a portion of one of said drive ring and drive gear.

22. An automatic hub for an optionally driven wheel of a vehicle having an engine and means for selectively connecting said engine with said wheel through a shaft disposed centrally of said wheel, said vehicle having a hollow spindle through which said shaft extends and said wheel having a hub rotatably mounted on said spindle, the extending end of said shaft having splines, said vehicle being provided with a brake backing plate, said wheel having bearings between said spindle and said wheel hub and said wheel hub being provided with a grease seal for said bearings, comprising an outer drive ring attached to said wheel hub; an inner drive gear mounted on the extending end of said shaft for rotation therewith; a series of rollers disposed in circumferentially spaced relation between said drive gear and said drive ring, said drive gear having grooves in which said rollers are normally disposed and inclined surfaces for forcing said rollers against said drive ring; a cage for maintaining said rollers in spaced position; a magnet coil disposed in said outer drive ring; a pin movable into engagement with one of said rollers upon energization of said coil; a switch for controlling the supply of current to said coil and operated by said means for selectively connecting said engine with said wheel; a slip ring mounted on said grease seal and insulated therefrom; a brush mounted on said brake backing plate, including a base formed of insulating material, an angular spring having one arm attached to said base and a contact engaging said slip ring and mounted on the other arm of said spring; a wire connecting a source of current with one side of said switch; a wire connecting said brush with the opposite side of said switch; and a wire extending through said hub and into said outer drive ring for connecting said slip ring with one end of said coil, the opposite end of said coil being grounded to said housing.

23. In a vehicle having an engine, a transmission including transmission means and selectively connectable transmission means, a pair of wheels driven from said transmission, a pair of optionally driven wheels, a propeller shaft adapted to be driven by said selectively connectable transmission means, a differential driven by said propeller shaft, a pair of drive axles driven by said differential, a wheel drive shaft for each optionally driven wheel and driven by one of said drive axles when said propeller shaft is driven by said selectively connectable transmission means, a frame supported by said wheels and on which said engine and transmission are mounted and a shift lever for said connectable transmission means for causing said transmission means to be connected through said selectively connectable transmission means to said propeller shaft, the improvement comprising the combination of a hub for selectively driving each of said optionally driven wheels from the corresponding wheel shaft, each said hub having means for selectively connecting said wheel with and disconnecting said wheel from said wheel shaft and electromagnetically operating means for causing said selective connection means to connect said wheel with said wheel shaft; an electrical switch mounted adjacent said shift lever; means mounted on said shift lever for engaging and closing said switch when said shift lever is moved to a position causing said transmission means to be connected through said selectively connectable transmission means to said propeller shaft; and an electrical circuit including said switch and said electromagnetically operating means of said hub, whereby each said hub will automatically connect said wheel to the corresponding wheel drive shaft when said switch is closed by said shift lever but said wheel and the corresponding drive shaft will be disengaged when said lever is moved to a position causing said transmission and said propeller shaft to be disconnected.

References Cited in the file of this patent
UNITED STATES PATENTS

| | | |
|---|---|---|
| 694,791 | Sack | Mar. 4, 1902 |
| 875,757 | Watson | Jan. 7, 1908 |
| 957,626 | Rivers | May 10, 1910 |
| 1,020,707 | Lemp | Mar. 19, 1912 |
| 1,121,751 | Montgomery | Dec. 22, 1914 |
| 1,182,589 | Schnuck | May 9, 1916 |
| 1,456,324 | Maier | May 22, 1923 |
| 2,329,916 | Lamb et al. | Sept. 21, 1943 |
| 2,345,972 | Hardy | Apr. 4, 1944 |
| 2,588,721 | Heller | Mar. 11, 1952 |
| 2,732,447 | Findley | Jan. 24, 1956 |
| 2,788,103 | Requa | Apr. 9, 1957 |
| 2,843,237 | Carr | July 15, 1958 |
| 2,844,238 | Peterson | July 22, 1958 |
| 2,874,814 | Beck | Feb. 24, 1959 |
| 2,883,025 | McKim | Apr. 21, 1959 |
| 2,919,000 | Clayton | Dec. 29, 1959 |
| 2,948,557 | Howe et al. | Aug. 9, 1960 |

UNITED STATES PATENT OFFICE
CERTIFICATE OF CORRECTION

Patent No. 3,123,169            March 3, 1964

Ralph C. Young et al.

It is hereby certified that error appears in the above numbered patent requiring correction and that the said Letters Patent should read as corrected below.

Column 13, line 7, for "wiht" read -- with --; column 14, line 21, for "shaid" read -- said --.

Signed and sealed this 7th day of July 1964.

(SEAL)
Attest:

ERNEST W. SWIDER
Attesting Officer

EDWARD J. BRENNER
Commissioner of Patents